United States Patent [19]

Juffa et al.

[11] 4,275,822

[45] Jun. 30, 1981

[54] APPARATUS FOR METERING AT LEAST TWO REACTION COMPONENTS INTO A MIXING CHAMBER

[75] Inventors: Richard Juffa, Cologne; Heinrich Boden, Leverkusen, both of Fed. Rep. of Germany

[73] Assignee: Bayer Aktiengesellschaft, Leverkusen, Fed. Rep. of Germany

[21] Appl. No.: 2,774

[22] Filed: Jan. 11, 1979

[30] Foreign Application Priority Data

Feb. 13, 1978 [DE] Fed. Rep. of Germany ....... 2805946

[51] Int. Cl.³ .......................... B67D 5/08; G06F 15/46
[52] U.S. Cl. ........................................ 222/63; 222/52; 222/134; 222/135; 137/99; 364/479
[58] Field of Search ........................ 222/14, 16, 23, 52, 222/27, 63, 76, 134, 135, 333; 137/98, 99, 101.19–101.21; 364/478, 479; 235/92 FL

[56] References Cited

U.S. PATENT DOCUMENTS

| | | | |
|---|---|---|---|
| 3,604,903 | 9/1971 | Hill et al. | 235/92 FL X |
| 3,667,651 | 6/1972 | Shapiro | 222/63 |
| 3,798,431 | 3/1974 | Schulkind et al. | 235/92 FL X |
| 3,967,634 | 7/1976 | Scherer et al. | 222/135 X |
| 4,008,829 | 2/1977 | Chandra et al. | 222/63 |
| 4,084,246 | 4/1978 | Schwartz | 137/101.19 X |

*Primary Examiner*—Stanley H. Tollberg
*Assistant Examiner*—Edward M. Wacyra
*Attorney, Agent, or Firm*—Gene Harsh; Joseph C. Gil

[57] ABSTRACT

The instant invention relates to an apparatus for metering at least two flowable reaction components, such as polyurethane-forming components, in a predetermined ratio into a mixing chamber. The apparatus broadly comprises a metering unit for each component, which is made up of a piston and cylinder, a feed pipe leading from a storage container into the cylinder, a delivery pipe leading from the cylinder to the mixing chamber and optionally a return pipe, and a drive unit. Each drive unit is in the form of an electro-hydraulic linear amplifier which comprises a stepping motor for a control mechanism which is coupled to a hydraulic piston and cylinder, wherein the drive unit is capable of driving the metering piston. Control electronics are provided for controlling the metering units. The controls comprise at least one adjustable control frequency generator for generating signals to be fed to the electro-hydraulic linear amplifiers to control the movements of the metering pistons. A first signal path is provided for conducting signals to at least one of the electro-hydraulic linear amplifiers from a control frequency generator and a second signal path is provided for conducting the control frequency generator signals to all other electro-hydraulic linear amplifiers via an adjustable frequency reducer.

3 Claims, 3 Drawing Figures

APPARATUS FOR METERING AT LEAST TWO REACTION COMPONENTS INTO A MIXING CHAMBER

BACKGROUND OF THE INVENTION

Apparatuses for metering two or more flowable reaction components are used for the preparation of reaction mixtures for filling cavities, and in particular for filling the cavities of molding tools. The moldings produced in this way, such as, for example, shock absorbers or front parts of motor vehicles, and dashboards, must meet stringent requirements. One of the most important conditions therefor is to combine the reaction components in the correct mixing ratio with the minimum deviation therefrom.

Suitable apparatuses which operate, for example, with piston pumps or gear pumps are generally used for this purpose. They are used in high pressure applications in conjunction with so-called injection mixers and in low pressure applications in conjunction with stirring mixers and/or static mixers.

High pressure metering apparatuses which are rigidly fixed directly to the molding tool, optionally via ancillary mixer heads, are preferably used for handling highly reactive reaction systems having setting times below 5 seconds.

Fast-running series, axial or radial piston pumps are generally used as metering pumps. Such pumps having, for example, 6-, 7- or 10-cylinders, are operated at speeds ranging from about 900 to 1500 r.p.m. at metering pressures of up to 250 bar and higher. High piston speeds and the tolerances between pistons and cylinders as well as tolerances in the control members of the pumps limit the viscosity of the components to be metered to a maximum of about 3,000 mPas. Metering of filler-containing components is not generally possible due to their abrasive behavior. With the conventional individual drive for such pumps by means of squirrel-cage induction motors, changes of pressure in the metering system inevitably lead to changes of speed and thus to an undesirable influence on the metering output. Other disadvantages of such rapidly running piston pumps in the production of moldings include problems of leakage between the metering pistons and cylinders as well as leakage through the additional control members between the suction side and delivery side of the pumps, high disturbance through noise, and the pulsed nature of the metered stream produced because of the delivery characteristics of the pumps.

It is also known to use apparatuses with displacement pistons as high pressure metering apparatus. Using this type of equipment, it is possible to process highly reactive and optionally filler-containing or high viscosity two-component systems in a strictly prescribed metering ratio which generally corresponds to the mixing ratio. The metering units are driven in this case by a hydraulic piston and cylinder unit rigidly connected to the metering units. This machinery allows the metering ratio to be changed (as is necessary when the formulation or filler is altered) in relatively large steps. Although it is possible to make a freely selected modification in the metering ratio during a metering stroke, the adjustment means operates very slowly and depends upon the predetermined large steps.

Equipment having two or more displacement piston pumps which may be driven by means of a common rotatable yoke are also known. These types of machinery do in fact allow the metering ratio to be modified more or less continuously. They are also used as low pressure instruments at a metering system pressure below 20 bar during the processing of slowly reacting systems. Such types of apparatus are not generally used for the high pressure metering of highly reactive systems at pressures above 200 bar because such a design requires a very high mechanical outlay at a filling volume above about 3 liters, due to the high actuating forces necessary. Another disadvantage lies in the change in position of the metering systems for the individual reaction components in relation to each other when the metering ratio is changed because the distance to the center of motion of the yoke changes in the process. Rigid coupling of the metering units and thus rigid piping or integration of all high pressure pipes leading to the mixer in a common housing, required for reasons of safety during high pressure processing, is not possible. Both systems have the particular disadvantage that each metering unit must be provided with a pressure limiting element (for example, a bursting disc or a spring-loaded ball valve) for reasons of safety, since the driving forces required for the two metering units could overload one of the systems if the other were to break down.

This disadvantage does not arise with apparatuses having individual drive for each metering unit since the transmission ratio between the hydraulic drive piston and the metering piston may be designed to be such that overloading caused by a maximum allowable pressure being exceeded in the high pressure metering pipes leading to the mixer head is not possible.

Thus, apparatuses have already been proposed in which the metering ratio is regulated by electronically controlled electro-hydraulic pilot valves. These types of apparatus consist of a displacement piston pump with a hydraulic drive cylinder and pilot valve flanged thereon for each component to be metered. The movement of a "leading" metering piston is sensed in this case. A movement of one or more "following" metering pistons corresponding to the metering ratio is electronically preselected and regulated via associated electro-hydraulic pilot valves. The movement of the "following" metering pistons is thus controlled on a master-slave basis. However, with this apparatus, particularly in the case of high advancing speeds for the metering pistons, constancy in the metering piston speeds in the preselected ratio required during the entire metering stroke and at any moment in the metering stroke is not possible to a tolerance of less than 1%. In addition, variations in pressure increase the tolerances both in the hydraulic drive system and in the metering system for the flowable reaction components which are formed, for example, during the opening and closing process for the associated mixing heads. This is caused by the unavoidable oscillation of hydraulic systems which are controlled by pilot valves. The accuracy of metering is also adversely affected by temperature-dependent variations in the viscosity of the hydraulic oil.

Typical apparatuses of the types described above aare disclosed in U.S. Pat. No. 3,901,408, U.S. Pat. No. 3,908,862, U.S. Pat. No. 4,008,829, U.S. Pat. No. 4,030,637, Great Britain Pat. No. 1,405,060 and Great Britain Pat. No. 1,535,968 and/or manufactured by Binks Manufacturing Co., Franklin Park, Ill.; Cincinnati Milacron Inc., Cincinnati, Ohio; Desma-Werke GMBH, D-2807 Achim, Federal Republic of Germany; Pyles Industries Inc., Warren, Mich.

An object of the invention is to provide an apparatus which ensures exact volumetric metering of flowable multi-component reaction systems into a mixing chamber, and more specifically in freely selectable and exactly reproducible metering ratios, wherein the deviation in the predetermined value of the metering ratio is to lie below 0.5% at any moment in the metering stroke, independently of external influences such as, for example, variations in pressure in the hydraulic and/or metering system.

DESCRIPTION OF THE INVENTION

According to the invention there is provided an apparatus for metering at least two flowable reaction components, in a preselected ratio into a mixing chamber, wherein a metering unit is provided for each component, each metering unit comprising a piston and cylinder, a feed pipe leading from a storage container into each cylinder, a delivery pipe leading from each cylinder to the mixing chamber, and a drive unit in the form of an electro-hydraulic linear amplifier comprising a stepping motor for a control mechanism which is coupled to a hydraulic piston and cylinder unit, the electrohydraulic linear amplifier being provided with control electronics which comprise at least one adjustable control frequency generator for a metering piston and an adjustable frequency reducer, e.g., a rate multiplier, for each other metering piston. Optionally, an adjustable control frequency generator can be provided for each metering piston; the frequency reducer then becomes unnecessary.

Electro-hydraulic linear amplifiers are commercially available. They consist, as described above, of a stepping motor, a control apparatus, and a hydraulic piston and cylinder unit. The control apparatus consists, for example, of a threaded spindle, a spindle nut and a spool valve or control valve. The particular advantage of such linear amplifiers is that the force of the piston rod may be transmitted directly to the part of the machine to be moved, i.e. on to the metering pistons which are immersed into the metering cylinder. The complicated transmission mechanisms, often affected by clearance problems, which are used in rotating drive mechanisms are thus avoided. In spite of this, extremely precise control of movement is achieved with a high degree of rigidity in the system. Such drive mechanisms are thus suitable for advancing movements which are free from backlash as well as for exact positioning. Such linear amplifiers are known and are described, for example, in the brochure entitled "Electro-hydraulic Linear Amplifier Model Series LVS", Wf 24, 30e, Edition 10, 1977, No. 30.23.521.2 issued by the firm SIG, Schweizerische Industriegesellschaft of CH-8212 Neuhausen am Rheinfall, Switzerland.

The invention allows the control frequency (which has been preselected on the control frequency generator or on the frequency reducer) to be converted via the stepping motor of the linear amplifier into an analogous, exactly reproducible advancing (and, thus, metering) speed. The ratio of the control frequencies that are selected for the various metering units on the control frequency generator and on the frequency reducers for different metering units (assuming that the metering piston diameters are the same) is, therefore, equal to the volumetric metering ratio of the reaction components. Because the control frequency ratio, which corresponds to the volumetric metering ratio, remains reproducibly constant even when the preselected control frequency on the control frequency generator is changed in relation to all frequency reducers, a simple reproducible effect on the total metering speed of all metering units results at a constant volumetric metering ratio. In addition, the preselection of an impulse amount on the linear amplifier of a metering unit for a mixing stroke permits the preselection of a stroke length and thus the exact control of the metered quantity. The control frequencies used for the control are between 50 and 5000 Hz, and preferably between 100 and 1000 Hz. The control frequency and thus the metering speed may be changed reproducibly in these ranges during a metering stroke. It is thus possible to produce moldings having geometrically varying properties.

The entire metering stroke is divided into pre-stroke, actual mixing stroke and after-stroke, which are followed by the return stroke during which the metering cylinder is refilled. The pre-stroke is used to stabilize the flow ratio before beginning the mixing stroke during start-up. All reaction components are recirculated into the storage container during the pre-stroke. The mixing stroke begins at the end of the pre-stroke. The reaction components are injected into the mixing chambers during the mixing stroke, mixed therein and fed as a reaction mixture into the cavity of a molding tool. The mixing stroke is followed by a short after-stroke. The reaction components are recirculated into the storage container during the after-stroke.

Figure 1:
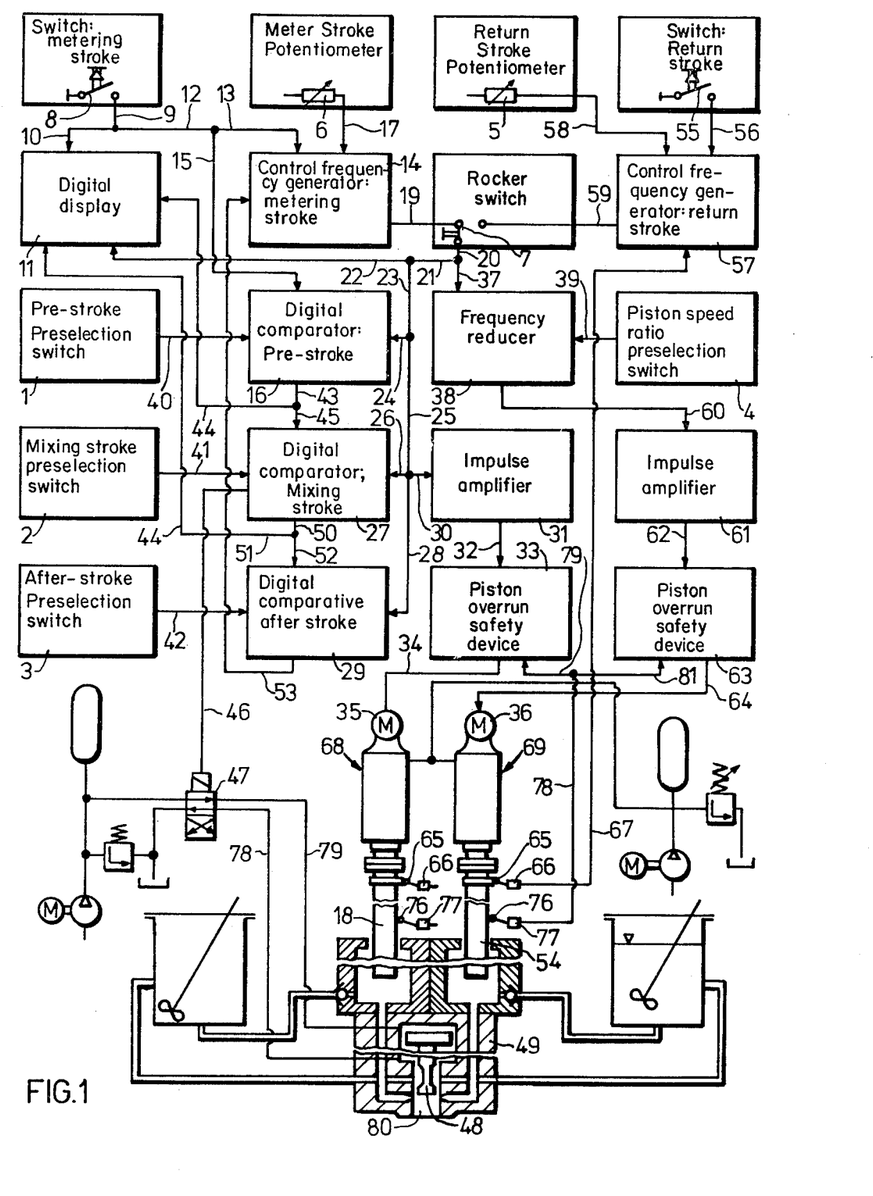
FIG. 1 represents a schematic diagram of the apparatus of the instant invention.
Figure 2:
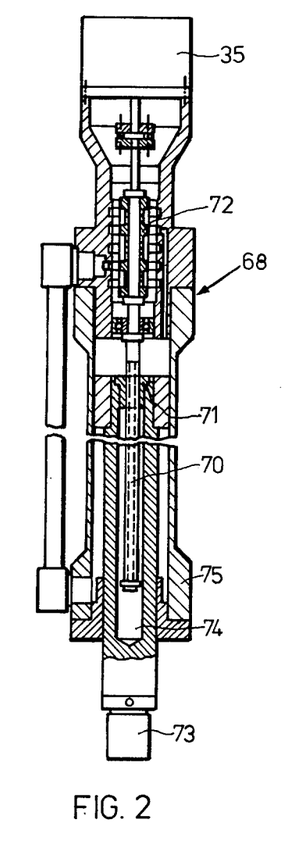
FIG. 2 represents an illustration of an electrohydraulic linear amplifier for use in the apparatus of the instant invention.

An embodiment of an apparatus according to the invention is shown diagrammatically in the accompanying drawings, in which:

FIG. 1 shows the apparatus with a detailed illustration of the control mechanism; and FIG. 2 shows the structure of an electro-hydraulic linear amplifier.

Figure 3:
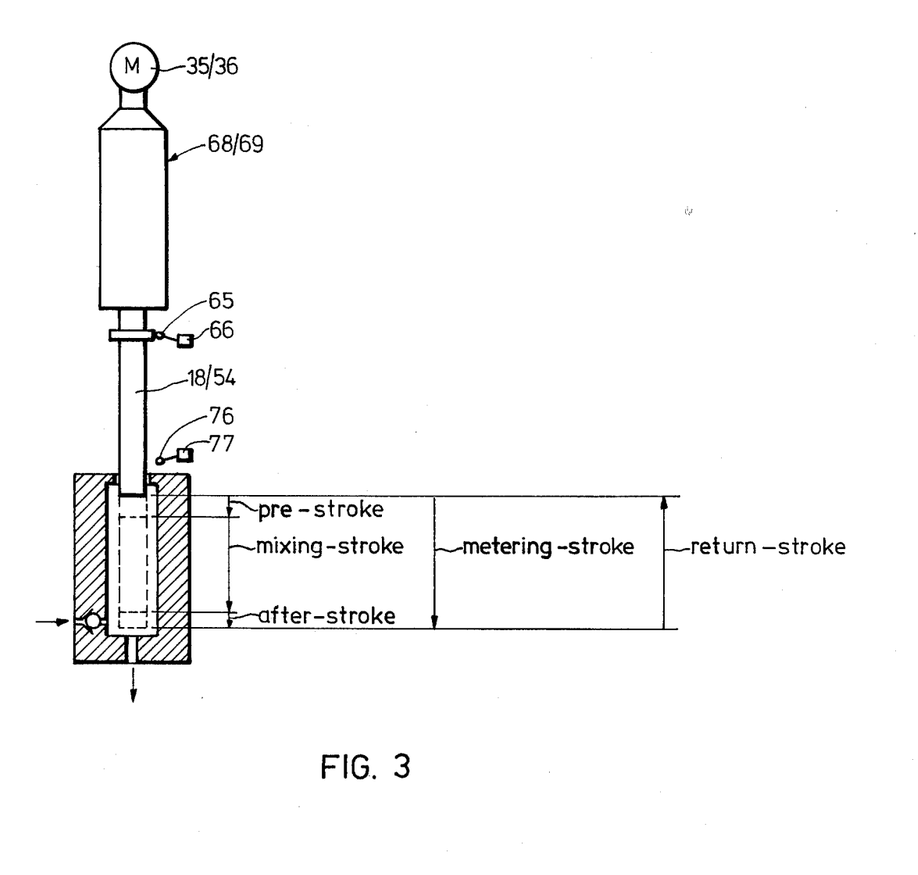
FIG. 3 represents a view of one piston in enlarged scale for illustrating the widths of the strokes.

FIG. 3 shows the widths of strokes illustrated at one piston.

The size of the pre-stroke may be regulated by means of a preselection switch 1. A preselection switch 2 is used to regulate the size of the mixing stroke. The after-stroke may be regulated by means of another preselection switch 3. The ratio of the metering piston speeds, which corresponds to the mixing ratio of the components in the case of equal metering piston diameters, is also preselectable by means of a preselection switch 4. The piston speed for the return stroke may be selected by a potentiometer 5, and the piston speed of the metering stroke, which is composed of pre-stroke, mixing stroke and after-stroke, may be selected by a potentiometer 6. The rocker switch 7 which is set at "metering stroke" at the beginning of the operating process is also provided for preselection.

After carrying out the preselections, the apparatus is ready for starting. A button 8 serves for starting the stroke whereby the digital display instrument 11 may be positioned at "0" via lines 9 and 10 while the control frequency generator 14 for the metering stroke may respond via lines 9, 12 and 13. The digital comparator 16 may also be activated for the pre-stroke via lines 9, 12 and 15. The control frequency generator 14 may be influenced via the line 17, by the potentiometer 6 to preselect the metering piston speed for the metering stroke. The control frequency of the control frequency generator 14 for the metering stroke may be selected by setting and/or regulating the speed of the metering piston 18 by means of the potentiometer 6. The control frequency is transmitted via line 19, rocker switch 7, and lines 20, 21 and 22 to the input of the digital display instrument 11 which gives a four-digit display of the pre-stroke and mixing stroke. In addition, the control frequency is simultaneously available for the pre-stroke digital comparator 16 via lines 20, 21, 23 and 24, for the mixing stroke digital comparator 27 via lines 20, 21, 23, 25 and 26 and for the after-stroke digital comparator 29 via lines 20, 21, 23, 25 and 28.

The control frequency controls the impulse amplifier 31 for the metering piston 18 via lines 20, 21, 23, 25 and 30 so that the amplified pulses from impulse amplifier 31 are fed via a line 32, a piston overrun safety device 33, and a line 34 to a stepping motor 35 of an electro-hydraulic linear amplifier 68. This drives the metering piston 18. In order to drive the stepping motor 36 integrated in the electro-hydraulic linear amplifier 69, the control frequency is fed via line 19, the rocker switch 7, and lines 20 and 37 to an adjustable frequency reducer 38. The frequency reducer 38 may be controlled to a value between 0 and 99% of the frequency coming from the control frequency generator 14 by the preselection switch 4 for the ratio of the piston speeds via line 39.

The pre-stroke, mixing stroke and after-stroke are preselected by regulating the number of pulses corresponding to the respective stroke. More specifically, this preselection takes place at preselection switch 1 with digital comparator 16 for the pre-stroke, at preselection switch 2 with digital comparator 27 for the mixing stroke and at preselection switch 3 with digital comparator 29 for the after-stroke.

The path of the pre-stroke may be read on the digital display instrument 11. When there is agreement between the pulses entering the digital comparator 16 and the regulated value at preselection switch 1, the digital comparator 16 for the pre-stroke transmits a signal via lines 43 and 44 to the digital display instrument 11 and sets this at "0", while the digital comparator 27 for the mixing stroke is able to respond at the same time via lines 43 and 45. When the mixing stroke starts, an electromagnetic hydraulic valve 47 for the control piston 48 may be actuated via line 46, the hydraulic valve 47 remaining activated throughout the entire mixing stroke. The control piston 48 of the mixing head 49 is thus driven into the upper dead center position which corresponds to the mixing position at the beginning of the mixing stroke and remains in it throughout the entire stroke.

At the end of the mixing stroke, there is agreement between the number of pulses entering the digital comparator 27 for the mixing stroke and the number of pulses predetermined at preselection switch 2. As a result of this, the circuit to the electromagnetic hydraulic valve 47 is interrupted and the valve 47 is thus reversed so that the control piston 48 of the mixing head 49 travels into the lower dead center position and the mixing process is thus ended by the interruption of the influx of component into the mixing chamber 80. The control piston 48 is actuated in known manner by the hydraulic valve 47 via the hydraulic lines 78 and 79.

Other conventional mixer heads with hydraulic or pneumatic control may be used instead of the hydraulically activated, slide-controlled injection mixer head.

In addition, the digital display instrument 11 is deactivated via lines 50, 51 so that the after-stroke takes place without display as the result of activation of the digital comparator 29 via lines 50 and 52. As soon as the predetermined number of pulses has entered the digital comparator 29, i.e. when there is agreement again between the number of pulses and the regulated value of the preselection switch 3, a signal is emitted. This signal stops the control frequency generator 14 for the metering stroke via line 53 and stops the apparatus.

According to the percentage ratio preselection of the components, the stepping motor 36 receives a corresponding percentage of the pulses received by the stepping motor 35. The metering piston 54 thus performs only the regulated percentage of that path which the metering piston 18 travels.

In order to be able to start a new metering process, the apparatus must be brought back into the starting position. The rocker switch 7 is brought into the return stroke position for this purpose.

The control frequency generator 57 for the return stroke may be activated via line 56 by activating the button 55 for the return stroke, which return stroke has received the adjustment voltage for the preselected piston speed from potentiometer 5 via line 58. The control frequency may be fed to the impulse output amplifier 31 via line 59, rocker switch 7, and lines 20, 21, 23, 25 and 30. The impulse amplifier 31 starts the stepping motor 35 via line 32, piston overrun safety device 33 and line 34. The control frequency is simultaneously fed via lines 20 and 37 to the frequency reducer 38, from which it starts the stepping motor 36, via line 60, impulse amplifier 61, line 62, piston overrun safety device 63 and line 64. The metering pistons 18 and 54 may be driven back into the starting position in the previously regulated speed ratio. There the end contacts 65 activate the limit switches 66 so that the control frequency generator 57, and thus the metering pistons 18 and 54, may be stopped via line 67. The digital comparators 16, 27 and 29 are inoperative during the return stroke phase.

The electro-hydraulic linear amplifiers are designated by numerals 68 and 69.

An embodiment of an electro-hydraulic linear amplifier 68 is shown in FIG. 2. This comprises a stepping motor 35, a control apparatus which is composed of a threaded spindle 70, a spindle nut 71 and a spool valve 72, and a hydraulic piston cylinder unit which is composed of the piston 73 in a hollow passage 74 of which the threaded spindle 70 is guided via the spindle nut 71, and the cylinder 75.

The electric stepping motor 35 performs, for example, one discrete step of 0.9° per pulse, i.e. it performs one revolution for every 400 pulses. It acts simultaneously as control system and measuring system in a similar way to a stepping switching mechanism. Since such a linear amplifier 68 forms a position control circuit with a rotating input, an accurately defined stroke increment of the piston 73 is allocated to each step of the motor 35. Very small stroke increments may thus be travelled, depending upon the screw pitch of the threaded spindle 70, without the position having to be detected by a complicated measuring system. Another dvantage of this type of operation is that several cylinders, even of differing size, may be controlled by the time logic, whereby totally synchronous operation can be achieved. Varying loads on the piston 73 cannot ffect the stepping motor 35 because the hydraulic piston and cylinder unit 73, 75 applies the forces required.

It may happen, as the result of a technical fault, that the metering pistons 18, 54 travel out beyond the preselected total stroke during the metering process. In order to protect the valuable apparatus from damage in this case, the piston overrun safety device 33 is provided for the metering piston 18 and the piston overrun safety device 63 is provided for the metering piston 54 (see FIG. 1). When the pistons 18, 54 overrun, the limit switches 77 are activated by the contacts 76. This has the result that the pistons overrun safety devices 33, 63 which interrupt the control frequencies for the stepping motors, 35, 36 are excited via lines 78, 79, 81 and both metering pistons 18, 54 thus stop.

The following represents a specific embodiment of the apparatus of the invention for producing a polyurethane molding:

1.0 Pre-setting by the linear amplifiers used:
1.1 Electrical stepping motors 35/36 with 400 pulses per revolution:
1.2 Pitch of the threaded spindles 70 and spindle nuts 71 amounts to 40 mm.

The following operating parameters are predetermined for the metering of the components; the widths of the strokes are shown in FIG. 3:

2.0 Adjustments or pre-setting for the polyol component:
2.1 Pre-stroke 5 cm. regulated at preselection switch which has a 2-position display and a range of regulation from 1 up to 16 cm:
2.2 Mixing stroke 10 cm, regulated at preselection switch 2 which has a 4-position display and a regulating range of from 0.01 to 20.00 cm:
2.3 After-stroke 2 cm, regulated at preselection switch 3 which has a 2-position display and a regulating range of from 1 up to 16 cm at most:
2.4 Return stroke (i.e. suction stroke) results automatically every 17 cm:
2.5 The diameter of the metering piston 18 is 80 mm:
2.6 Piston area: 50.265 cm$^2$:
2.7 The metering volume of the polyol component may be determined from this as 502.65 cm$^3$ during the mixing stroke (piston area 50.265 cm$^2$ × mixing stroke 10 cm):

3.0 Regulating and pre-setting for the isocyanate component which is to be metered in proportion to 49% by volume of the polyol component:
3.1 Pre-stroke 2.45 cm, corresponding to 49% of the pre-stroke for the polyol component, regulated at pre-selection switch 1:
3.2 Mixing stroke 4.9 cm, corresponding to 49% of the mixing stroke for the polyol component, regulated at preselection switch 2:
3.3 After-stroke 0.98 cm, corresponding to 49% of the after-stroke for the polyol component, regulated at pre-selection switch 3:
3.4 Return-stroke (i.e. suction stroke) results automatically every 8.33 cm:
3.5 The diameter of the metering piston 54 is 80 mm:
3.6 Piston area: 50.265 cm$^2$:
3.7 The metering volume of the isocyanate component results from this as 246.298 cm$^3$ during the mixing stroke.

4.0 Other pre-set values:
4.1 Ratio f the piston speeds, corresponding to the mixing ratio of 49%, also 49% regulated at pre-selection switch 4 which has a 2-position display of from 0 to 99%:
4.2 The desired pre-stroke speed of the metering piston 18 is 10 cm per second, by regulation of the potentiometer 6 which has a 2-position maximum adjustibility of 10 cm per sec, on the scale value 10:
4.3 The pre-stroke speed of the metering piston 54 is inevitably 49% of that of the metering piston 18, i.e. 4.9 cm per sec:
4.4 The desired total metering volume during the mixing stroke which results from the product of the stroke paths and the piston areas is 748.95 cm$^3$:
4.5 Desired return stroke period 6 sec, which may be regulated at potentiometer 5, via
4.6 The desired return stroke speed of the metering piston 18. This is regulated at potentiometer 5, which has a 2-position maximum adjustibility of 10 cm per second, to a value of 3.6 cm per second; corresponding scale value 3.6:
4.7 The return stroke speed of the metering piston 54 is inevitably 49% of that of the metering piston 18, i.e. 1.734 cm per sec.

After the rocker switch 7 has been set at "pre-stroke", so that the control generator 14 is connected to line 20 via the rocker switch 7, the apparatus is ready for operation.

With regard to the progress of operation, reference is made to the description of the illustrated embodiment so that only information over and above this is given below:

The regulation of the potentiometer 6 to the scale value 10 corresponds to a control frequency at the stepping motor 35 of 1 KHz. A pulse interval of $t=1/f=1/1000=1$ ms is thus formed. As the stepping motor 35 rotates through 0.9° per pulse, the metering piston is advanced by 0.1 mm in 1 ms. It thus moves at a speed of 10 cm per second. The stepping motor 36 receives only 49% of the control frequency of the stepping motor 35, that is to say 0.49 KHz. The pulse interval is therefore $t=1/f=1/0.49=2.04$ ms. This corresponds to a speed of the metering piston 54 of 4.9 cm per sec, since the stepping motor 36 also rotates through 0.9° per pulse and the metering piston 54 is pushed 0.1 mm forward in 2.04 ms. Consequently, in this example, a metering ratio of 2.04:1 is maintained throughout the entire metering process consisting of pre-stroke, mixing stroke and after-stroke. 500 pulses must be fed to the digital comparator 16 for the pre-stroke corresponding to the pre-stroke pre-selection of 5 cm in the case of an advance of 10 cm per second, in order for the comparator to sense an equality. 1000 pulses are fed to the digital comparator 27 for the mixing stroke corresponding to the mixing stroke pre-selection of 10 cm in the case of an advance of 10 cm per second, in order to reach equality. Finally, 200 pulses are fed to the digital comparator 29 for the after-stroke corresponding to the after-stroke preselection of 2 cm in the case of an advance of 10 cm per second, in order to be fully coordinated.

What is claimed is:

1. An apparatus for metering at least two flowable reaction components in a preselected ratio into a mixing chamber comprising:

(A) a metering unit for each component, each metering unit comprising:
  (i) a metering piston and a cylinder,
  (ii) a feed pipe leading from a storage container into said cylinder,
  (iii) a delivery pipe leading from said cylinder to said mixing chamber, and
  (iv) a drive unit in the form of an electro-hydraulic linear amplifier comprising a stepping motor for a control mechanism which is coupled to a hydraulic piston and cylinder, wherein said drive unit is capable of driving said metering piston, and
(B) control electronics for controlling said metering units, said control electronics comprising:
  (i) at least one adjustable control frequency generator for generating signals to be fed to said electrohydraulic linear amplifiers to control the movement of said metering pistons,
  (ii) a first means of conducting said signals to at least one of said electro-hydraulic linear amplifier, and
  (iii) a second means for conducting said signals to all other electrohydraulic linear amplifiers via an adjustable frequency reducer.

2. An apparatus for metering at least two flowable reaction components in a preselected ratio into a mixing chamber comprising:
(A) a metering unit for each component, each metering unit comprising:
  (i) a metering piston and a cylinder,
  (ii) a feed pipe leading from a storage container into said cylinder,
  (iii) a delivery pipe leading from said cylinder to said mixing chamber, and
  (iv) a drive unit in the form of an electro-hydraulic linear amplifier comprising a stepping motor for a control mechanism which is coupled to a hydraulic piston and cylinder, wherein said drive unit is capable of driving said metering piston, and
(B) control electronics for controlling said metering units, said control electronics comprising:
  (i) at least one adjustable control frequency generator for generating signals to be fed to said electrohydraulic linear amplifiers to control the movement of said metering pistons, and
  (ii) a means for conducting said signals to said electrohydraulic linear amplifiers.

3. An apparatus according to claim 1 or 2, wherein each metering unit includes a return pipe leading back to its respective storage container.

* * * * *

REEXAMINATION CERTIFICATE (565th)
United States Patent [19]
Juffa et al.

[11] B1 4,275,822
[45] Certificate Issued  Sep. 16, 1986

[54] APPARATUS FOR METERING AT LEAST TWO REACTION COMPONENTS INTO A MIXING CHAMBER

[75] Inventors: Richard Juffa, Cologne; Heinrich Boden, Leverkusen, both of Fed. Rep. of Germany

[73] Assignee: Bayer Aktiengesellschaft, Leverkusen, Fed. Rep. of Germany

Reexamination Request:
No. 90/000,314, Jan. 12, 1983

Reexamination Certificate for:
Patent No.: 4,275,822
Issued: Jun. 30, 1981
Appl. No.: 2,,774
Filed: Jan. 11, 1979

[30] Foreign Application Priority Data
Feb. 13, 1978 [DE] Fed. Rep. of Germany ....... 2805946

[51] Int. Cl.$^4$ ............................................. B67D 5/08
[52] U.S. Cl. ........................ 222/63; 222/52;134;135; 137/99; 364/479
[58] Field of Search ...................... 222/14, 16, 23, 52, 222/56, 57, 63, 134, 135, 333; 137/101.19, 101.21; 364/478, 479; 235/92 FL; 377/21

[56] References Cited
U.S. PATENT DOCUMENTS

| | | | |
|---|---|---|---|
| 3,604,903 | 9/1971 | Hill et al. | 235/92 FL X |
| 3,667,651 | 6/1972 | Shapiro | 222/63 |
| 3,695,295 | 10/1972 | Olsen et al. | 137/625 |
| 3,798,431 | 3/1974 | Schulkind et al. | 235/92 FL X |
| 3,899,956 | 8/1975 | Olsen | 91/368 |
| 3,967,634 | 7/1976 | Scherer et al. | 222/135 X |
| 4,008,829 | 2/1977 | Chandra et al. | 222/63 |
| 4,084,246 | 4/1978 | Schwartz | 137/101.19 X |
| 4,101,612 | 7/1978 | Barker et al. | 264/22 |

*Primary Examiner*—Joseph R. Rolla

[57] ABSTRACT

The instant invention relates to an apparatus for metering at least two flowable reaction components, such as polyurethane-forming components, in a predetermined ratio into a mixing chamber. The apparatus broadly comprises a metering unit for each component, which is made up of a piston and cylinder, a feed pipe leading from a storage container into the cylinder, a delivery pipe leading from the cylinder to the mixing chamber and optionally a return pipe, and a drive unit. Each drive unit is in the form of an electro-hydraulic linear amplifier which comprises a stepping motor for a control mechanism which is coupled to a hydraulic piston and cylinder, wherein the drive unit is capable of driving the metering piston. Control electronics are provided for controlling the metering units. The controls comprise at least one adjustable control frequency generator for generating signals to be fed to the electro-hydraulic linear amplifiers to control the movements of the metering pistons. A first signal path is provided for conducting signals to at least one of the electro-hydraulic linear amplifiers from a control frequency generator and a second signal path is provided for conducting the control frequency generator signals to all other electro-hydraulic linear amplifiers via an adjustable frequency reducer.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-3 are cancelled.

* * * * *